Feb. 17, 1970  E. ANDRESEN  3,496,397
DOUBLE CAGE ROTOR FOR A DYNAMOELECTRIC MACHINE
Filed Dec. 21, 1967
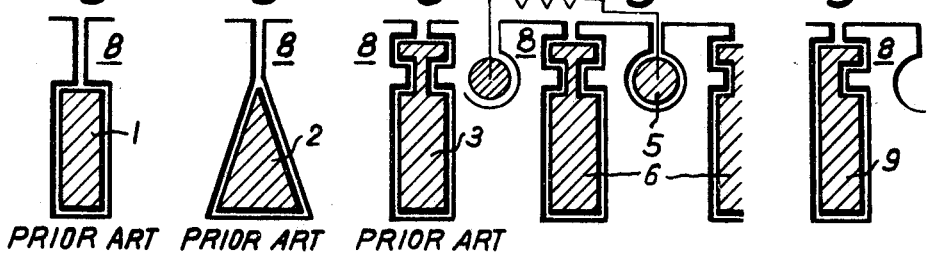
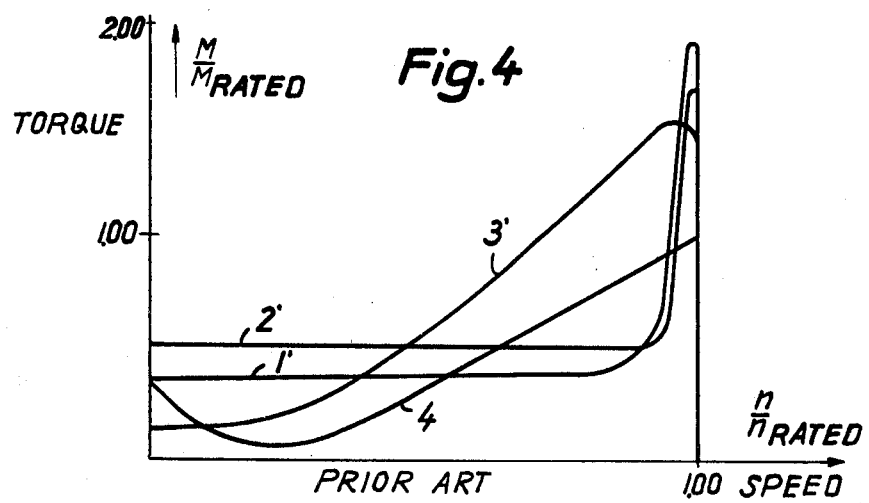
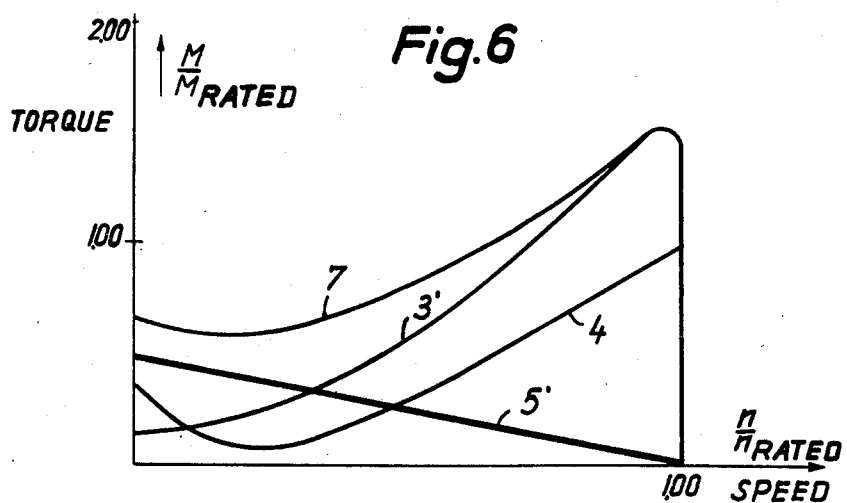
Inventor:
Egon Andresen
By: Spencer & Kaye
Attorneys

United States Patent Office 3,496,397
Patented Feb. 17, 1970

3,496,397
DOUBLE CAGE ROTOR FOR A DYNAMOELECTRIC MACHINE
Egon Andresen, Berlin, Germany, assignor to Licentia Patent-Verwaltungs-G.m.b.H., Frankfurt am Main, Germany
Filed Dec. 21, 1967, Ser. No. 692,472
Claims priority, application Germany, Dec. 23, 1966, L 55,347
Int. Cl. H02k 3/08
U.S. Cl. 310—212        3 Claims

ABSTRACT OF THE DISCLOSURE

A double cage rotor for an asynchronous rotating electrical machine which provides a high starting as well as running torque. The rotor includes a "running cage" having bars with a hammerhead cross section and a "starting cage" having bars arranged in the spaces between the bars of the running cage. The bars of the starting cage are provided with an electrical resistance, preferably arranged externally to the rotor iron core.

Background of the invention

The present invention relates to a double cage rotor for high power asynchronous rotating electrical machines.

Rotors of asynchronous electric machines are often constructed as single "squirrel cages" comprising a plurality of bars short-circuited by means of "short-circuit rings." Especially when it has been necessary to improve the starting behavior of asynchronous electric motors, these rotors have also been constructed as double cage rotors, whereby one cage serves as a "running cage" to provide the running torque and the other as a "starting cage" to provide the starting torque. These types of double cages usually have bars lying in the upper and in the lower portion of the same rotor core slot separated from each other by a high, narrow leakage passage. Either, both cages can have common or each cage separate short-circuit rings; they are not, as the single cages sometimes are, provided with additional resistance.

Also known, though less frequently employed, are double cage rotors having the starting cage arranged in the gaps—that is, offset to the side—between the bars of the running cage. If this configuration is used, the starting cage is constructed so that it generates practically the entire starting torque of the motor. This requires that the bars of the starting cage be of circular or square cross section. The bars of the running cage, on the other hand, are preferably made rectangular in shape and arranged somewhat deeper in the magnetic iron of the rotor than the bars of the starting cage. Neither the bars of the starting nor the running cage include a resistance.

To obtain a more complete understanding of the background of the present invention, reference will now be made to certain figures of the drawings wherein FIGURES 1, 2 and 3 are axial, cross-sectional views of portions of three different squirrel cage rotors showing a single bar thereof, and FIGURE 4 a diagram of the torque speed curves of asynchronous motors which are designed to produce a high-rated power and which have rotor cages made of bars of the type shown in FIGURES 1, 2 and 3.

FIGURE 1 shows a single bar 1 of a so-called "high bar rotor" arranged in the rotor magnetic iron core 8. This type of rotor produces the torque speed curve 1' indicated in FIGURE 4. FIGURES 2 and 3 show the cross-sectional configuration of bars 2 and 3 of a key bar rotor and a hammerhead bar rotor, respectively.

These rotors produce the corresponding torque speed curves 2' and 3' shown in FIGURE 4.

The countertorque produced by a typical blower, pump or compressor is also graphed in FIGURE 4 as a load line 4. Since this load line rises above the torque speed curves 1', 2', 3' of the motors having the three rotor embodiments shown in FIGURES 1, 2 and 3, none of these motors will have sufficient torque to overcome the load either when starting (curve 3') or shortly before reaching the rated speed (curves 1' and 2'). Though it is possible to increase the motor torque by increasing the rated power of the motor, such a step is not recommended since not only the cost of the motor but also its starting current will considerably increase.

Summary of the invention

An object of the present invention, therefore, is to design a double cage rotor suitable for high power asynchronous machines of the type having a starting cage arranged between the bars of a running cage, which produces a torque speed curve that substantially follows, over its entire speed range of operation, the contours of the countertorque curve of the type given in FIGURE 4.

This, as well as other objects which will become apparent in the discussion that follows, are achieved, according to the present invention, by constructing the bars of the running cage with a hammerhead cross-sectional configuration and by providing the bars of the starting cage with an electrical resistance. This resistance can be arranged outside of the rotor iron core in the manner known in the prior art.

Brief description of the drawings

FIGURE 1 is an axial cross-sectional detailed view of one bar of a high bar rotor of the type known in the prior art.

FIGURE 2 is an axial cross-sectional detailed view of one bar of a key bar rotor of the type known in the prior art.

FIGURE 3 is an axial cross-sectional detailed view of one bar of a hammerhead bar rotor of the type known in the prior art.

FIGURE 4 is a diagram of the torque speed curves of prior art motor having rotors of the type illustrated in FIGURES 1, 2 and 3.

FIGURE 5 is an axial cross-sectional detailed view of one embodiment of a double cage rotor according to the present invention.

FIGURE 6 is a diagram of the torque speed curves of a motor having a rotor of the type illustrated in FIGURE 5.

FIGURE 7 is an axial cross-sectional detailed view of a second embodiment of a double cage rotor according to the present invention.

Description of the preferred embodiments

Referring now to the drawings, there are shown, in FIGURE 5, the two types of bars associated with a double cage rotor according to one embodiment of the present invention. The hammerhead-shaped bars 6 of the running cage are arranged to the left and to the right of the circular-shaped bar 5 of the starting cage. The additional electrical resistance in series with the starting cage bar 5 is arranged outside of the iron core 8 of the rotor, as shown, in the manner well known to those skilled in the art.

For an electric motor such a relation between the resistance of the starting cage to the running cage might be in the range from $10^1$ to $10^2$. For example, for a motor at 12,000 kilowatts of power such a relation might be from about 60, or, absolutely, the starting cage has a resistance from 160 mΩ.

A motor employing a double cage rotor of the type illustrated in FIGURE 5 describes a torque speed curve which is illustrated in detail in FIGURE 6. The torque speed curve produced by the hammerhead bar rotor 6 is the same as that of the hammerhead bar rotor 3 shown in FIGURE 3. Therefore, both this resulting curve 3' as well as the countertorque curve 4 are the same as the identically numbered curves drawn in FIGURE 4. The starting cage, having the starting bars 5 shaped and positioned as shown in FIGURE 5 and provided with an additional electrical resistance outside of the core of the rotor, produces the torque characteristic given by the line 5' in FIGURE 6. The addition of the curve 3' in the line 5' results in a curve 7 describing the torque speed characteristic of a motor having a rotor according to the present invention. This curve 7 lies considerably above the countertorque curve 4 over the entire speed range of the motor. In other words, a motor provided with a double cage rotor in accordance with the present invention will be able to drive a load having a countertorque curve such as that shown in FIGURE 6 without requiring an increase in its rated power.

FIGURE 7 illustrates another embodiment of the double cage rotor according to the present invention. The manufacture of the hammerhead-shaped bars of the running cage may be considerably simplified by making them one-sided, as are the "semi-hammerhead" bars 9 there shown.

It will be understood that the above description of the present invention is susceptible to various modifications, changes and adaptations, and the same are intended to be comprehended within the meaning and range of equivalents of the appended claims.

I claim:
1. In a double cage rotor for an asynchronous rotating electrical machine having the bars of a starting cage arranged in the spaces between the bars of a running cage, the improvement that said bars of said running cage have a hammerhead cross section and said bars of said starting cage having connected therewith external series resistance means.

2. The improvement defined in claim 1 wherein said rotor includes an iron core surrounding at least a portion of said bars.

3. The improvement defined in claim 1 wherein said bars of said running cage have a semi-hammerhead cross section.

References Cited

UNITED STATES PATENTS

| 1,695,946 | 12/1928 | Bergman | 310—212 |
| 2,242,007 | 5/1941 | Leader | 310—212 |
| 2,242,008 | 5/1941 | Leader | 310—212 |
| 3,401,280 | 9/1968 | Lackey et al. | 310—211 X |

FOREIGN PATENTS 740,689   10/1943   Germany.

WARREN E. RAY, Primary Examiner